United States Patent [19]

Mollere

[11] 4,351,036
[45] Sep. 21, 1982

[54] SUBMARINE CABLE CONNECTOR LINK

[75] Inventor: John C. Mollere, Nassau Bay, Tex.

[73] Assignee: Western Geophysical Co. of America, Houston, Tex.

[21] Appl. No.: 190,674

[22] Filed: Sep. 25, 1980

Related U.S. Application Data

[63] Continuation-in-part of Ser. No. 69,208, Aug. 23, 1979, Pat. No. 4,260,211.

[51] Int. Cl.³ .............................................. H01R 13/62
[52] U.S. Cl. .................................. 367/20; 339/47 R; 339/49 R; 367/154
[58] Field of Search .............. 367/20, 154; 339/47 R, 339/49 R, 94 R, 94 M, 104

[56] References Cited

U.S. PATENT DOCUMENTS

| | | | |
|---|---|---|---|
| 1,975,467 | 10/1934 | Livingston | 339/49 R |
| 2,465,696 | 3/1949 | Paslay | 367/20 X |
| 2,739,290 | 3/1956 | Child | 339/49 R |
| 3,290,645 | 12/1966 | Pavey, Jr. et al. | 367/24 |
| 3,376,948 | 4/1968 | Morrow | 367/18 X |
| 3,812,455 | 5/1974 | Pearson | 367/154 |
| 3,855,566 | 12/1974 | Richardson | 339/49 R |
| 3,964,771 | 6/1976 | Baudouin | 285/315 |
| 4,092,629 | 5/1978 | Siems | 367/79 |
| 4,166,663 | 9/1979 | Walker et al. | 339/49 B |
| 4,204,188 | 5/1980 | Weichart et al. | 340/320 |

Primary Examiner—Richard A. Farley
Attorney, Agent, or Firm—William A. Knox

[57] ABSTRACT

A hermaphroditic submarine cable connector link for a multisection seismic marine streamer cable includes identical end fittings mounted at each end of a pair of adjacent cable sections. Identical connector plates are coupled to electrical conductors at each end of the sections. The connector plates from the pair of adjacent cable sections are mated and then linked to the end fittings. A barrel is slipped over the end fittings and around the mated connector plates. The end fittings are locked by the barrel in spaced-apart relationship, employing a ball-and-detent locking arrangement.

5 Claims, 4 Drawing Figures

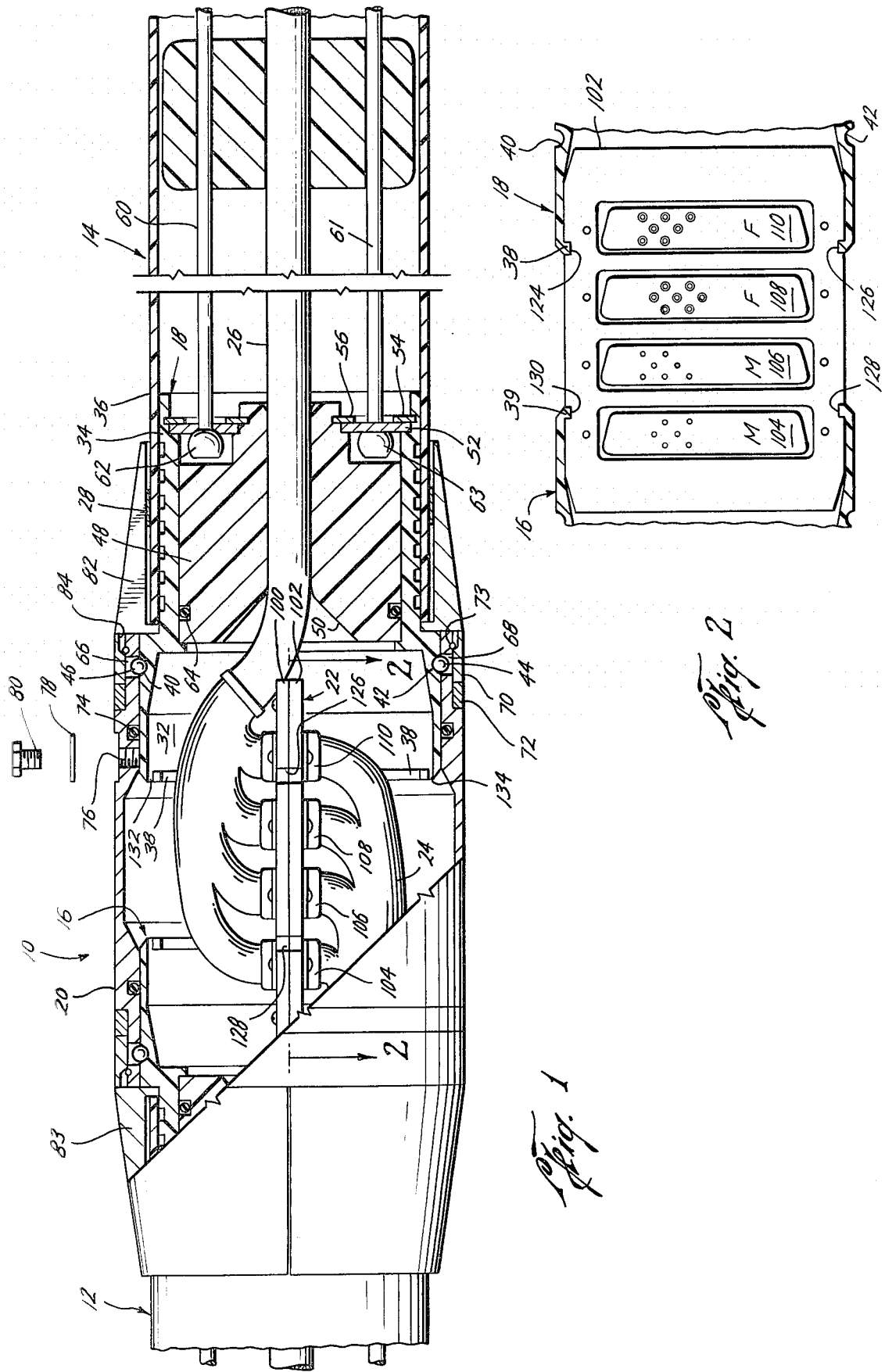

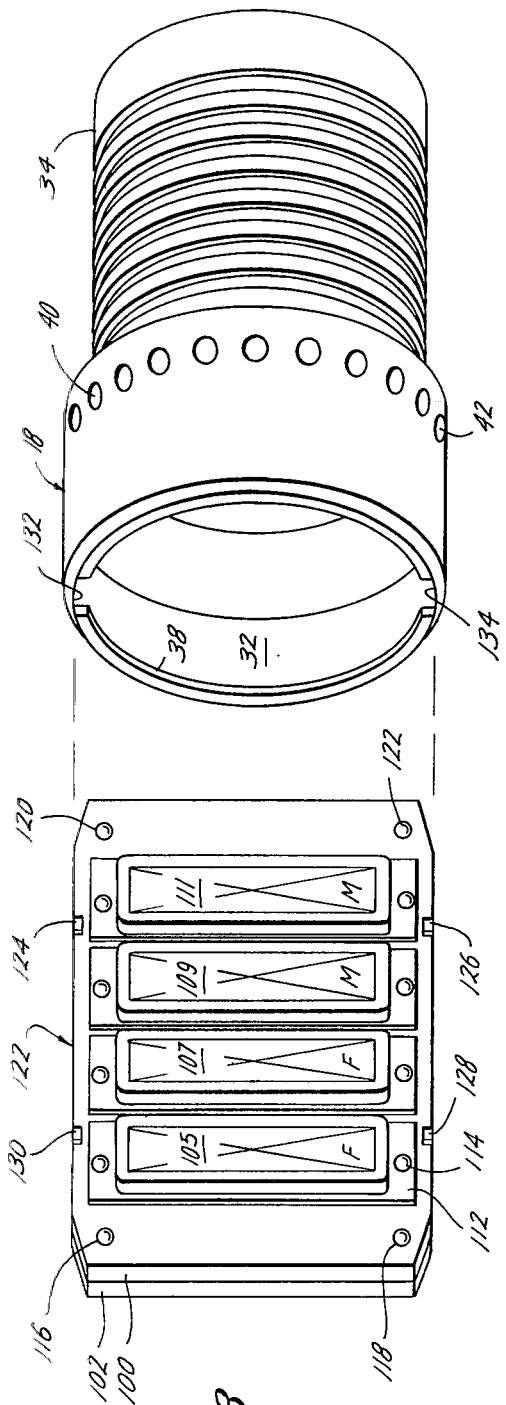
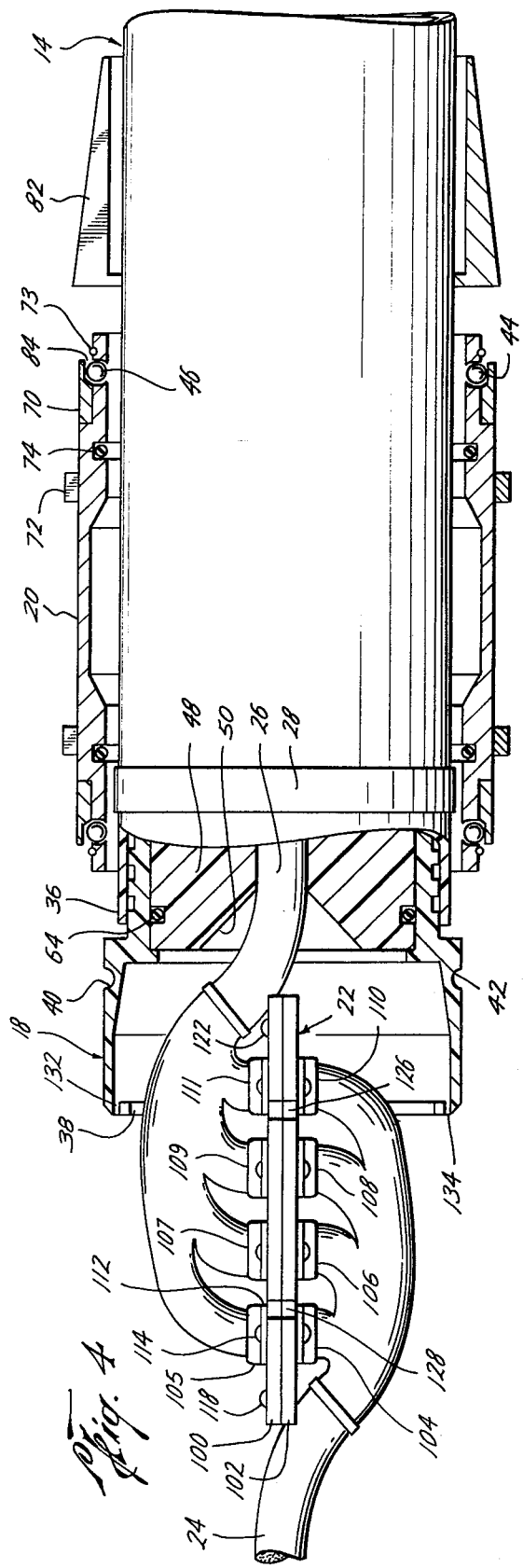

SUBMARINE CABLE CONNECTOR LINK

RELATION TO OTHER APPLICATIONS

This application is a continuation-in-part of co-pending patent application Ser. No. 069,208, now U.S. Pat. No. 4,260,211, filed Aug. 23, 1979, which is incorporated herein by reference.

BACKGROUND OF THE INVENTION

1. Field of the Invention

This invention is directed to a device for coupling together the sections of a multi-section seismic marine streamer cable, such as might be found in classes 181/.5 and 340/7R.

2. Description of the Prior Art

A detailed description of the construction and use of seismic streamer cables was presented in the above-referenced co-pending patent application Ser. No. 069,208. Nevertheless, for completeness, a brief overview of prior-art seismic cables will be presented.

A typical seismic marine streamer cable may be two miles or more long and is customarily towed behind a ship along a proposed line of survey. The streamer cable is made up of a number of sections that may be 200 to 300 feet long so that fifty or so sections make up the complete streamer cable. Contained within the streamer cable are a plurality of hydrophones for detecting seismic waves. The hydrophones are grouped together to form separate, individual data channels. There may be more than 300 such data channels. Since each data channel requires two conductors to transmit seismic signals to a signal utilization device, 600 or more separate wires are contained within the streamer cable along with the hydrophones.

Since the entire streamer cable is composed of a plurality of separate sections, means must be provided to couple the sections together mechanically and electrically. A number of different varieties of streamer couplers are known. One venerable type of coupler is shown in FIGS. 1 and 1a of U.S. Pat. No. 3,376,948 to Morrow. In FIG. 4 of the same patent, Morrow illustrates an improved design employing a cylindrical multiconductor pin-and-socket electrical plug and a screw-type mechanical coupler. One particular objection to Morrow's multiconductor plug is that, for a cylindrical plug of manageable size, having a diameter less than about 2.5 to 3 inches, only about 100 wires can be accommodated. Furthermore, the entire coupler must be completely disassembled from an associated streamer section to repair broken wires.

Another coupler assembly is shown in FIG. 3 of U.S. Pat. No. 3,812,455. Here, a two-part assembly is provided that is bolted together. Inside the assembly, a recess is provided for three elongate male and female plugs to which the wires are soldered. Here again, the number of wires that can be accomodated is limited. Although the wiring is reasonably accessible, the plugs cannot be inspected after mating because the connector plugs are mated at the same time that the two halves of the coupler are assembled.

Other typical streamer cables are described in U.S. Pat. No. 2,465,696 to Paslay, U.S. Pat. No. 3,290,645 to Pavey Jr. et al and U.S. Pat. No. 4,092,629 to Siems et al.

The streamer cable coupler disclosed in the above referenced co-pending application Ser. No. 069,208 now U.S. Pat. No. 4,260,211 consists of a two-part, hollow, quick-disconnect fitting having an internal diameter sufficient to contain a multicontact connector plate for electrically interconnecting the signal wires from two adjacent streamer sections. The two-part fitting includes male and female parts. The parts are lockable together by locking balls mounted in the female part that fit into detents around the circumference of the male part when the two parts are mated together. A locking ring holds the balls in place after assembly.

The coupler as disclosed in my copending application was an improvement over the earlier known couplers in that the ball-and-detent locking mechanism permitted easy assembly and disassembly of the coupler. When the male and female parts are separated from one another, the connector plates and wiring were completely exposed for servicing. An indefinite number of wires could be accommodated because more connector plugs could be provided simply by lengthening the connector plate and, if necessary, by lengthening the female housing as well.

Despite its advantages over earlier couplers, the need for certain improvements soon became apparent. When the two parts of the housing were separated so that the plug-wiring on the connector plate could be serviced, the only mechanical attachment between two adjacent cable sections was the wiring itself. In the field, aboard a rocking ship at sea, it was difficult to keep the adjacent sections from being pulled apart during servicing.

A considerable amount of slack in the conductors was required so that the connector plate could be fully withdrawn from the female housing. When the coupler housings were reassembled, it was necessary to double back and stuff the wires into the female housing and around the connector plate. With several hundred wires involved, there was danger that one or more wires would be pinched or broken during the reassembly process.

Finally, because one part of the two-part coupler was male and the other part female, a pair of cable sections could be assembled in only one way, that is one cable section could not be turned end-for-end with respect to the other cable section. The cable sections were effectively polarized. Indeed, all known cable sections used in present-day marine seismic operations suffer from that same disadvantage.

A ball-and-detent quick-disconnect electrical connector is disclosed in U.S. Pat. No. 3,964,771. Like all other known connectors, that connector is polarized, i.e. it is made up of a male and a female part. Additionally, to service the internal conductors and the pins and sockets, the entire assembly must be completely taken apart.

SUMMARY OF THE INVENTION

It is an object of this invention to provide hermaphroditic couplers for a marine seismic streamer cable.

It is a further object of this invention to provide couplers that will accommodate any desired number of electrical conductors or wires and which is easily and quickly coupled or decoupled.

In accordance with a preferred embodiment of this invention, identical, end-fittings are secured to the ends of a seismic streamer cable section. The exposed ends of the fittings have a plurality of detents around their outer peripheries. A lip is provided around the inner wall of the exposed ends of the end fittings. A pair of slots are cut into the lip at diametrically opposite locations. An elongated connector plate for mounting a plurality of hermaphroditic connector plugs, has a pair of notches at each end of the connector plate. The notches are fitted through the slots to engage the lip inside the end fittings after being turned a portion of a turn to flexibly link the connector plate to the end fittings. A cylindrical barrel is provided. The barrel includes a plurality of balls floatingly mounted around the perimeter at each end of the barrel. The barrel fits over the two end fittings so that the balls at each end of the barrel engage the corresponding detents of the respective end fittings. Axially slideable locking rings cover the balls to lock them in place. The locking rings are held in place by split-ring keepers. O-rings are mounted inside the barrel, and bear against the outer surface of the end fittings. When the two end fittings are mated with the barrel, the whole assembly forms a water tight enclosure for the conductors and plugs.

In accordance with an aspect of this invention, a bevelled split-ring fairing is mounted next to each end of the barrel for streamlining purposes.

BRIEF DESCRIPTION OF THE DRAWINGS

A better understanding of the novel features and advantages of this invention will be had by reference to the detailed description and the drawings wherein:

FIG. 1 is a longitudinal cross section of the cable connector link;

FIG. 2 is a cross section along line 2—2';

FIG. 3 is an isometric showing of the manner of linking a pair of mated connector plates with an end fitting; and FIG. 4 is a showing in partial cross section of the right half of the connector link partially disassembled.

DETAILED DESCRIPTION OF THE PREFERRED EMBODIMENT

Referring now to FIG. 1 there is shown in partial cross section a hermaphroditic quick-disconnect coupler 10 that connects together a pair of adjacent cable sections 12 and 14. The coupler 10 consists essentially of three parts: Two end fittings 16 and 18 that are secured to the ends of the pair of adjacent cable sections 12 and 14 respectively, and a barrel 20. Barrel 20, in combination with end fittings 16 and 18 provides mechanical connection between adjacent cable sections 12 and 14. A connector plate assembly 22, mounted axially inside barrel 20, furnishes means for electrically coupling together the electrical conductors or wires in each cable section. The electrical conductors, in the form of wire bundles 24 and 26, transmit signals from hydrophones, not shown, to a signal utilization device aboard a towing ship as described in my copending application Ser. No. 069,208.

The end fittings will now be described in detail. Since fittings 16 and 18 are identical only end fitting 18 will be considered. An end fitting such as 18 is secured to both ends of the cable sections by a steel band such as 28. Since the fittings at both ends of a cable section are identical it is immaterial which end of the section is the leading end.

End fitting 18 is cylindrical with a slightly enlarged exposed portion 32. A smaller-diameter serrated portion 34 fits inside the plastic jacket 36 of a cable section 14. As pointed out above, the end fitting is fastened in place by a band 28. Typically band 28 is a preformed stainless steel circlet that fits snugly around jacket 36. The serrated portion 34 of end fitting 18 is then swaged tightly inside jacket 36 and the encircling band 28.

A lip 38, whose use will be described below, is formed just inside the end of exposed portion 32 of fitting 18. A plurality of detents such as 40 and 42 are milled around the periphery of exposed portion 32 to receive a like plurality of floating balls 44 and 46, to be discussed later with respect to barrel 20. The detents may be hemispherical, conical, trihedral or tetrahedral although the latter two shapes would be difficult to machine.

A plug 48 is located in serrated portion 34 of fitting 18. Plug 48 is preferably of plastic such as LEXAN. A tapered bore or passageway 50 serves to support and guide wire bundle 26 from cable section 14, to connector plate assembly 22. Wire bundle 26 is cemented inside bore 50 by epoxy cement. A stress-member termination plate 52 is held in place near the inner end of fitting 18 by a snap ring 54. Plug 48 is secured to termination plate 52 by a second snap ring 56. Termination plate 52 is used for anchoring the stress members, such as 60, 61 of cable section 14, to end fitting 18 by means of an anchoring knobs 62,63. Only two stress members 60, 61 are shown but three or more may be used in practice. Normally, a cable section such as 14 is filled with a light-weight fluid, such as un-odorized kerosene, to render the section neutrally bouyant. An O-ring 64 seals the fluid in the cable section from leaking out through end fitting 18 when coupler 10 is disassembled.

Barrel 20 is cylindrical, having a length that is determined by the length of the connector plate 22. The inner diameter of barrel 20 is sufficient to provide a slip fit over the exposed enlarged portion 32 of fitting 18 as well as clearance over the jacket 36 of cable section 14. Since both ends of barrel 20 are identical, only the right hand end will be discussed in detail. A plurality of hemispherical ball-retaining orifices such as 66 and 68 are drilled around the circumference at each end of barrel 20. A like plurality of balls float in the retaining orifices. The ball-retaining orifices are sized so that a portion of the balls project beyond the inner surface of barrel 20. There are as many balls as there are detents around end fitting 18. An axially slidable locking ring 70 secures the balls in the respective detents when moved to the right as shown in FIG. 1. A circumferentially-positioned split-ring keeper 72 holds locking ring 70 in the locked position. A spring clip 73 prevents locking ring 70 from sliding off the end of barrel 20. When assembled, therefore, barrel 20 provides a means for releasably locking the end fittings together in spaced-apart relationship and mechanically connects together the pair of adjacent cable sections, inhibiting them from relative rotation and from separation when under longitudinal tension.

An O-ring ring 74 seals the inside volume of barrel 20 from fluid invasion or from fluid leakage. An oil-fill hole 76 is provided at any convenient place on barrel 20, for introduction of a light-weight fluid for bouyancy. Fill hole 76 is closed by washer 78 and plug 80. If desired, an electrically insulating coating of epoxy or the like can be sprayed on the interior wall of barrel 20, avoiding of course, spray around the O-ring and the floating balls. Alternatively, an insulating plastic liner can be provided. A tapered split-ring fairing 82 made of a plastic such as DELRIN fits around band 28 and cable jacket 36, abutting the end of barrel 20. The fairing protects the end face of barrel 20 and streamlines the assembly when the assembly is towed through the water.

Coupler 10 is readily disassembled as follows: Refer to FIG. 4. The keeper such as 72 at the right hand end of barrel 20 is removed. The locking ring such as 70 is then moved inwards to the left. A lip 84 inside locking ring 70, releases the balls such as 44 and 46 from the detents 40 and 42 of end fitting 18. The barrel 20 and the end fitting 18 are then readily separated without the use of hand tools. By applying the same procedure to the left hand end of the barrel, the barrel may be released from end fitting 16. After removing the right hand tapered fairing 82, the entire barrel 20 can be slid to the right over end fitting 18 and out of the way, back along cable section 14, to expose the wiring and connectors for inspection and maintenance.

Electrical connections between two cable sections are made by means of connector plate assembly 22. Refer to FIGS. 2 and 3. The assembly consists of a pair of connector plates 100, 102 to each of which is floatingly secured a plurality of multicontact connector plugs 104, 106, 108, 110. One plate of each pair is associated with one of the adjacent cable sections 12 and 14. Each connector plate includes a number of rectangular openings designed to receive an elongated miniature multicontact plug such as the Cinch DMM 50 P, a 50-pin male plug or the Cinch DMM 50 S, a 50-socket female plug, both made by TRW Inc. of Elk Groove Village, Ill. In FIGS. 2 and 3 only four sets of plugs are shown but many more may be used in practice. Of course, one connector plate could contain all male plugs and the other plate, all female plugs. However to provide a hermaphroditic plug configuration, half of the connector plugs on each plate are male and the other half are female as shown in FIG. 2. By that arrangement, and since the configuration is identical for both connector plates either end of one cable section can be connected to either end of an adjacent section.

Each connector plug includes a mounting flange such as 112 of plug 105, FIG. 3, for fastening the plug to a connector plate by small retaining screws such as 114. Plug 105 mounted on plate 100 is of course, a female plug to mate with male plug 104 on plate 102. The number of connector plugs per connector plate depends upon the number of wires in the cable section. In the Figures, four plugs are shown but more may be used. Since each plug has 50 contacts, twelve such plugs will accommodate 600 wires which are soldered to the respective pins and/or sockets of the plugs in conventional manner. The flat connector plate assembly 22 is quite compact and fits easily inside barrel 20. A twelve-plug connector plate for example measures but 2.75×8.0 inches. Because of the large number of individual connector plugs in each plate, the plugs must be self-aligning when two plates are mated together. Accordingly, they are floatingly mounted by providing a small amount of free play between the retaining screws and the mounting flanges.

After the respective connector plates and plugs from a pair of adjacent cable sections are mated, the two plates are fastened together as a single unit by small bolts such as 116, 118, 120, 122 as shown in FIG. 3.

The assembled connector plates include a pair of notches near each end as shown in FIGS. 2 and 3. As described earlier, the end fittings such as 18 have a lip 38 around the inside circumference of the enlarged exposed portion 32. At two diametrically opposite positions, slots 132 and 134 are cut into the lip 38. The width of the slot is slightly wider than the thickness of the assembled connector plates. When coupler 10 is to be assembled, the ends of the connector plate assembly are inserted into the slots 132 and 134 until the notches such as 124 and 126 in the connector plate assembly 22 are aligned with lip 38. At that point, the connector plate is rotated about a quarter-turn with respect to the end fittings. Since lip 38 now engages the notches 124 and 126 the end fittings are flexibly linked to the connector plates and there is no danger of the wires being pulled apart during final checkout of the electrical connections.

Assembly of the coupler section is as follows: Refer to FIG. 4. The ends of two cable sections to be coupled are brought together. Split-ring tapered fairing 82 is spread apart and slipped over end fitting 18 and down cable section 14. Barrel 20 with locking rings and balls retracted is slipped over an end fitting such as the right hand fitting 18 and it is slid to the right, out of the way, around cable section 14. Split-ring tapered fairing 83 is spread apart and moved out of the way to the left, around cable section 12 not shown in FIG. 4. The connector plates 100 and 102 from the adjacent cable sections 14 and 12 respectively next are mated and then bolted together. Thereafter, the notches at each end of the assembled connector plate are made to engage lip 38 through slots 132 and 134 of end fitting 18 and similarly for end fitting 16 as in FIG. 2. The connector plate assembly 22 is turned a portion of a turn with respect to the two end fittings 16 and 18. Next, with locking rings 70 and 71 retracted, barrel 20 is moved to the left until the balls at each end are aligned with the corresponding detents of the two end fittings 16 and 18 as shown in FIG. 1. The locking rings are then moved outwardly to a locking position so that the balls are locked in place in the detents. The keepers are then emplaced behind the locking rings. With the balls locked in place, end fittings 16 and 18 are rigidly fixed in place against tension and rotation relative to barrel 20. Finally split-ring tapered fairings 82 and 83 are locked in place as shown in FIG. 1.

I claim as my invention:

1. A hermaphroditic submarine cable connector link for coupling together a pair of adjacent elongated seismic streamer cable sections, the sections including at least one stress member, a plurality of hydrophones, a plurality of wires for transmitting hydrophone signals and an outer jacket, comprising:
   identical end fittings fastened to the ends of the pair of adjacent cable sections for receiving the plurality of wires;
   identical connector plates at the ends of the adjacent cable sections for mounting a plurality of multicontact connector plugs to which said plurality of wires are connected;
   means for mating the connector plates of the pair of adjacent cable sections;
   means for linking the mated connector plates to the end fittings of said adjacent cable sections;
   an outer barrel for engaging and rigidly locking together the end fittings of said adjacent cable sections;
   an internal lip around an internal circumference of an exposed portion of said end fittings;
   a pair of diametrically opposed slots in said lip; and
   a pair of notches near each end of the mated connector plates for engaging the lips of said end fittings after insertion of said mated connector plates through said slots.

2. The cable connector link as defined by claim 1, comprising:

a plurality of detents around the periphery of the exposed portion of said end fittings;

a like plurality of locking balls disposed around the circumference at each end of said barrel for engaging the detents around said end fittings;

means for releasably locking said balls in said detents when said barrel engages said end fittings.

3. The cable connector link as defined in claim 2, comprising:

a pair of split-ring tapered protective fairings surrounding the cable jacket and abutting the ends of said barrel.

4. A hermaphroditic undersea connector link for coupling together a pair of adjacent elongated seismic streamer cable sections, the sections including at least one stress member, a plurality of hydrophones, a plurality of wires for transmitting hydrophone signals and an outer jacket comprising:

identical end fittings fastened to the ends of the pair of adjacent cable sections, the end fittings defining a passageway for receiving the plurality of wires;

identical flat connector plates, at the ends of each cable section, having a plurality of multicontact connector plugs floatingly mounted thereon, each of the contacts of the plugs being connected to a corresponding one of the wires received by the end fittings;

means for releasably mating the connector plates of the pair of adjacent cable sections;

means for flexibly linking opposite ends of the mated connector plates with corresponding end fittings of the pair of adjacent cable sections;

an outer barrel slidable over the end fittings and the outer jacket of said cable section for fixedly securing together the end fittings in a spaced-apart relationship so that said end fittings are inhibited from relative rotation and longitudinal separation when under tension;

a plurality of detents around the periphery of the exposed portion of the end fittings that are secured to a pair of adjacent cable sections;

a like plurality of locking balls disposed in ball-retaining orifices around the circumference at each end of said outer barrel for engaging the detents around said end fittings;

a pair of axially sliding locking rings for releasably locking said balls in said detents when said barrel engages said end fittings; and a pair of circumferentially mounted split-ring keepers for maintaining said locking rings in a ball-locking position.

5. The cable connector link as defined in claim 4, comprising:

means for sealing said barrel and said end fittings from fluid invasion and fluid leakage.

* * * * *